US012764739B2

(12) United States Patent
Feltrin et al.

(10) Patent No.: US 12,764,739 B2
(45) Date of Patent: Oct. 13, 2026

(54) CONTROLLING AN INDICATION OF USER DATA IN A BUFFER OF A UE FOR SMALL DATA TRANSMISSION

(71) Applicant: Telefonaktiebolaget LM Ericsson (publ), Stockholm (SE)

(72) Inventors: Luca Feltrin, Solna (SE); Andreas Höglund, Solna (SE); Tuomas Tirronen, Helsinki (FI); Jan Christoffersson, Luleå (SE); Henrik Enbuske, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 555 days.

(21) Appl. No.: 18/247,905

(22) PCT Filed: Oct. 20, 2021

(86) PCT No.: PCT/SE2021/051039

§ 371 (c)(1),
(2) Date: Apr. 5, 2023

(87) PCT Pub. No.: WO2022/086410

PCT Pub. Date: Apr. 28, 2022

(65) Prior Publication Data

US 2023/0379905 A1 Nov. 23, 2023

Related U.S. Application Data

(60) Provisional application No. 63/094,929, filed on Oct. 22, 2020.

(51) Int. Cl.
*H04W 72/1268* (2023.01)
*H04W 28/02* (2009.01)
(Continued)

(52) U.S. Cl.
CPC .... *H04W 72/1268* (2013.01); *H04W 28/0278* (2013.01); *H04W 74/0833* (2013.01); *H04W 74/0836* (2024.01)

(58) Field of Classification Search
CPC ......... H04W 72/1268; H04W 74/0833; H04W 28/0278; H04W 74/0836; H04W 72/21
See application file for complete search history.

(56) References Cited

U.S. PATENT DOCUMENTS

2013/0301541 A1* 11/2013 Mukherjee ........ H04W 74/0833 370/329
2023/0156847 A1* 5/2023 Zhang .................. H04W 76/20 370/329

OTHER PUBLICATIONS

PCT International Search Report and Written Opinion mailed Jan. 31, 2022 for International Application No. PCT/SE2021/051039, 14 pages.

(Continued)

*Primary Examiner* — Kathy W Wang-Hurst
(74) *Attorney, Agent, or Firm* — Sage Patent Group

(57) ABSTRACT

A method of controlling an indication of user data in a buffer of a User Equipment (UE) is provided. The user data is for Small Data Transmission (SDT) when the UE is in inactive mode. Based on a threshold value related to an amount of the user data for SDT, the UE determines whether to include an indication into a first uplink grant allocation transmission. The indication would indicate that user data is in the buffer. When an indication of user data in a buffer is not included in the first uplink grant, this indicates that the amount of data left in the buffer is less than the threshold value minus the first allocated grant transmission size, and when an indication of user data in a buffer is included, the indication indicates how many further transmissions are needed for transmitting the rest of the pending data.

11 Claims, 19 Drawing Sheets

(51) Int. Cl.
*H04W 74/0833* (2024.01)
*H04W 74/0836* (2024.01)

(56) References Cited

OTHER PUBLICATIONS

3GPP; Technical Specification Group Radio Access Network; NR; Medium Access Control (MAC) protocol specification (Release 16); 3GPP TS 38.321 V16.1.0 (Jul. 2020); 151 pages.

3GPP; Technical Specification Group Radio Access Network; NR; Radio Resource Control (RRC) protocol specification (Release 16); 3GPP TS 38.331 V16.1.0 (Jul. 2020); 895 pages.

ETSI MCC, Report of 3GPP TSG RAN2#111-e meeting, Online, 3GPP TSG-RAN WG2 meeting #112-e, R2-2008xxx, Aug. 17-28, 2020, 327 pages.

Ericsson, New SID on support of reduced capability NR devices, 3GPP TSG RAN Meeting #86, RP-193238, Sitges, Spain, Dec. 9-12, 2019, 5 pages.

ZTE Corporation, Work Item on NR smalldata transmissions in INACTIVE state, 3GPP TSG RAN Meeting #86, RP-193252, Sitges, Spain, Dec. 9-12, 2019, 4 pages.

ZTE Corporation, Work Item on NR smalldata transmissions in INACTIVE state, 3GPP TSG RAN Meeting #86, RP-200954 (Update of RP-193252), Sitges, Spain, Dec. 9-12, 2019, 5 pages.

Interdigital, Subsequent small data transmission, 3GPP RAN WG2 Meeting #113-e, R2-201xxxx, Jan. 25-Feb. 5, 2021, 5 pages.

Intel Corporation, SDT mechanism on RRC/non-RRC based approaches and RACH requirements, 3GPP TSG RAN WG2 Meeting #111-e, R2-2006713, Electronic meeting, Aug. 17-28, 2020, 10 pages.

Qualcomm Incorporated, Rach based NR small data transmission, 3GPP TSG-RAN WG2 Meeting #111e, R2-2007540, Online, Aug. 17-28, 2020, 5 pages.

Interdigital, RACH-based UL small data transmission procedure, 3GPP RAN WG2 Meeting #111-e, R2-2007613, Aug. 17-28, 2020, 3 pages.

* cited by examiner

CONTROLLING AN INDICATION OF USER DATA IN A BUFFER OF A UE FOR SMALL DATA TRANSMISSION

CROSS-REFERENCE TO RELATED APPLICATIONS

This application is a 35 U.S.C § 371 national stage application for International Application No. PCT/SE2021/051039, entitled "CONTROLLING AN INDICATION OF USER DATA IN A BUFFER OF A UE FOR SMALL DATA TRANSMISSION", filed on Oct. 20, 2021, which claims priority to U.S. Provisional Patent Application No. 63/094,929, filed on Oct. 22, 2020, assigned to the assignee hereof, and expressly incorporated herein by reference.

TECHNICAL FIELD

Embodiments herein relate to a User Equipment (UE) and methods therein. In some aspects, they relate to controlling an indication of user data in a buffer of the UE. The user data in the buffer is for Small Data Transmission (SDT) in a wireless communications network when the UE is in inactive mode.

BACKGROUND

In a typical wireless communication network, wireless devices, also known as wireless communication devices, mobile stations, stations (STA) and/or User Equipment (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

3GPP Status

A Work Item (WI) RP-200954 *"New Work Item on NR small data transmissions in INACTIVE state"* has been approved by 3GPP wherein the focus of the WI is to focus on optimizing the transmission for small data payloads by reducing the signaling overhead. The WI RP-200954 contains the following relevant objectives for enabling SDT in an inactive Radio Resource Control (RRC), RRC_INACTIVE, state:

- Uplink (UL) SDT for Random Access Channel (RACH)-based schemes, i.e. 2-step and 4-step RACH:
  - A general procedure to enable User Plane (UP) data transmission for small data packets from an INACTIVE state e.g. using Message (MSG) A or MSG3 messages as will be further detailed.
  - Enable flexible payload sizes larger than a 3GPP Release 16 Common Control Channel (CCCH) message size that is, for INACTIVE state, for MSGA and MSG3, to support UP data transmission in UL, e.g. wherein an actual payload size can be determined by a network configuration.
  - Context fetch and data forwarding in INACTIVE state for RACH-based solutions, with and without anchor relocation.
- Transmission of UL data on pre-configured Physical Uplink Shared Channel (PUSCH) resources, i.e. by reusing a configured grant type 1 when Timing Advance (TA) is valid.
  - General procedure for SDT over the configured grant type 1 resources from INACTIVE state.
  - Configuration of the configured grant type1 resources for small data transmission in UL for INACTIVE state.

For Narrowband Internet of Things (NB-IoT) and LTE including enhanced Machine Type Communication (eMTC), also denoted LTE-M, related signaling optimizations for small data have been introduced in 3GPP Release 15, Early Data Transmission (EDT), and 3GPP Release 16, Preconfigured Uplink Resources (PUR). Further related solutions may be expected for NR with the difference that 3GPP Release 17, NR Small Data, is only to be supported for the RRC INACTIVE state, which includes a 2-step RACH based small data. Further it should include regular complexity mobile broadband (MBB) UEs. Both cases support Mobile Originated (MO) traffic only.

Within the context of SDT, the possibility of transmitting subsequent data has been discussed. In this context, transmitting subsequent data means the transmission of further segments of data that cannot fit in an Msg3 Transport Block. Such further segments of data can be transmitted either in a connected RRC state, RRC_CONNECTED, as in legacy after a 4-step RACH procedure has been completed, or they can be transmitted in RRC_INACTIVE before the UE transitions to RRC_CONNECTED. In the former case the transmission will be more efficient as the NR base station, i.e. gNB, and UE are appropriately configured based on the current UE channel conditions. In the latter case, several optimization are not in place yet, especially if the UE has moved while not being connected, furthermore, the transmission may collide with the transmission from other UEs as contention has not been resolved yet.

The Work Item has already started in 3GPP meeting RAN2 #111-e, wherein the following relevant agreements have already been made:

- Small data transmission with an RRC message is supported as a baseline for Random Access (RA) based and Cell Group (CG) based schemes.
- The 2-step RACH or 4-step RACH should be applied to RACH based uplink small data transmission in RRC_INACTIVE.
- The uplink small data can be sent in MSGA of 2-step RACH or msg3 of 4-step RACH.
- Small data transmission is configured by the network on a per DRB basis.
- Data volume threshold is used for the UE to decide whether to do SDT or not. For Further Study (FFS): How to calculate data volume.
- FFS: if an additional SDT specific Reference Signal Received Power (RSRP) threshold is further to be used to determine whether the UE should do SDT.
- UL and/or Downlink (DL) transmission following UL SDT without transitioning to RRC_CONNECTED is supported.
- When UE is in RRC_INACTIVE, it should be possible to send multiple UL and DL packets as part of the same SDT mechanism and without transitioning to RRC_CONNECTED on a dedicated grant. FFS: Whether any indication to network is needed.

RRC States

From the RRC layer point of view, a UE can be camping in a cell in either one of three different states, RRC_IDLE, RRC_INACTIVE and RRC_CONNECTED.

In RRC_IDLE the UE is not connected to a CN, instead, a series of mechanisms allow the UE to monitor the paging channel while saving energy. In RRC_CONNECTED the UE is connected to the CN and the UE can perform unicast data transfer. Usually in this state, the UE monitors more frequently the downlink control channel in order to react quickly to DL transmissions. The RRC_CONNECTED state however consumes more energy that the RRC_IDLE state. RRC_INACTIVE is a new state introduced in NR which combines aspects from the other two states. In RRC_INACTIVE, the UE is connected to the CN, but also configured to save energy by employing a behavior similar to the one in RRC_IDLE.

The transition from a state to another state is controlled by the RRC layer, and specifically by a gNB which sends appropriate messages to confirm the state transition. This is illustrated in In FIG. 1, where all the possible state transitions are shown with the relative RRC Message as UE state machine.

Some transitions illustrated in FIG. 1 is related to the following cases:

- If the UE is in an RRC_INACTIVE state and receives a release message with suspend, i.e. RRCRelease with suspendConfig, indication will stay in RRC_INACTIVE.
- If the UE is in RRC_INACTIVE and receives a resume message, i.e. RRCResume it will transition to RRC_CONNECTED.
- If the UE is in RRC_CONNECTED and receives a release message, i.e. RRCRelease, with Suspend indication it will move to RRC_INACTIVE.

Random Access Procedures

The 4-step RACH procedure may be triggered by the UE in order to acquire radio resources from the network in order to transmit or receive data. In legacy, the scope of this procedure, beyond synchronizing with a gNB, is to transition to RRC_CONNECTED.

The 4-step Random Access procedure is illustrated in FIG. 2. After receiving the random access configuration, the UE first transmits a random preamble in the Physical Random Access Channel (PRACH) with the possibility of colliding with other UEs sending the same preamble. Then, the UE receives an Msg2 or Random Access Response (RAR), which contains a Timing Advance (TA) command used to synchronize a time offset of the UE with a frame structure used by the gNB. Further, the RAR or Msg2 also contains an UL grant to transmit a following message, Msg3.

Msg3 is transmitted by the UE, which contains the first RRC message with which the UE requests a state transition to the gNB, e.g. in this context, msg3 message is an RRCResumeRequest. Msg3 also comprises a UE identifier, used by the gNB to retrieve the UE context to further act appropriately as the UE have configurations to be considered. In the context of EDT and/or SDT, Msg3 may also comprise user data.

Finally, in Msg4 the gNB sends a Contention Resolution ID, which comprises a copy of the previous transmission used by the UE to determine whether or not a possible collision has been resolved. Colliding UEs will send different Msg3s, hence, only one UE will have a matching Contention Resolution ID.

Msg4 also comprises the last RRC message which determines the state transition. Typically, in legacy, this message is an RRCResume message, meaning that the UE can transition to RRC_CONNECTED and start a data transfer. However, in the context of EDT and/or SDT, the RRC message can also be an RRCRelease message, which terminates the transition if user data has been transmitted in Msg3.

2-Step RACH

With the 2-step procedure the random access is completed in only two steps as illustrated in FIG. 3 which illustrates the following two-step initial access procedure:

- Step 1: The UE sends a message A including a random access preamble together with higher layer data such as a RRC connection request possibly with some small payload on PUSCH e.g. denoted msgA PUSCH. The msgA PUSCH is used for SDT in inactive;
- Step 2: The gNB sends a response called message B (msgB), e.g. which may be described as a modified RAR, including an UE identifier assignment, TA information, and contention resolution message, etc. In addition, msgB may contain a higher layer part. Similar to a RAR, a msgB may contain responses to multiple msgAs, and thus to multiple UEs, but the optional higher layer part can only pertain to one of the responses i.e. to one of the msgAs/UEs. If a response in a msgB does not have an associated higher layer part, this will be sent in a separate subsequent message, e.g. an RRC message, on the PDSCH.

The msgB is a response to msgA, which may contain contention resolution message(s), fallback indication(s) to schedule Msg3 transmission, and backoff indication.

The msgB is a response to msgA, which may contain responses to multiple UEs and with different kinds of information for different UEs depending on the outcome of the msgA transmission/reception and the load on the access resources.

Upon a successful msgA reception, the gNB includes a successRAR Medium Access Control (MAC), sub Packet Data Unit (subPDU) as a response for the concerned UE, where the successRAR MAC subPDU includes a contention resolution identity, a timing advance and a Cell Radio Network Temporary Identifier (C-RNTI) allocation. If the gNB successfully received the RACH preamble, but failed to receive msgA PUSCH, the gNB can respond to the concerned UE with a fallbackRAR MAC subPDU in the msgB. The fallbackRAR essentially turns the 2-step RA into a 4-step RA and consequently the fallbackRAR MAC subPDU contains an UL grant, a timing advance and a temporary C-RNTI (TC-RNTI) allocation, but no contention resolution identity. The UE uses the UL grant to retransmit msgA PUSCH in the form of Msg3.

Buffer Status Report

The general scope of Buffer Status Report (BSR) is to inform the gNB of the status of the Logical Channel buffers, specifically of the amount of data that is currently pending for UL transmission. Several formats are specified depending on the amount of data that is pending and how many logical channels are active. BSR is specified in MAC specification of 3GPP TS 38.321. v16.2.1. As described in the 3GPP TS 38.321 v16.2.1. clause 5.4.5, the Buffer Status reporting procedure is used to provide the serving gNB with information about UL data volume in the MAC entity.

For any BSR other than a Pre-emptive BSR, RRC configures the following parameters to control the BSR:

periodicBSR-Timer;
retxBSR-Timer;
logicalChannelSR-DelayTimerApplied;
logicalChannelSR-DelayTimer;
logicalChannelSR-Mask;
logicalChannelGroup.

Each logical channel may be allocated to a Logical Channel Group (LCG) using the logicalChannelGroup. The maximum number of LCGs is eight. The MAC entity determines the amount of UL data available for a logical channel according to the data volume calculation procedure.

A BSR other than a Pre-emptive BSR shall be triggered if any of the following events occur:

UL data for a logical channel, which belongs to an LCG, becomes available at the MAC entity; and either this UL data is associated with a logical channel with higher priority than the priority of any logical channel containing available UL data associated to any existing LCG; or none of the logical channels which belong to an LCG contains any available UL data, in which case the BSR is referred below to as a 'Regular BSR';

UL resources are allocated, and the number of padding bits is equal to or larger than the size of the Buffer Status Report MAC Control Element (CE) plus its subheader, in which case the BSR is referred below to as 'Padding BSR';

the retxBSR-Timer expires, and at least one of the logical channels which belong to an LCG contains UL data, in which case the BSR is referred below to as a 'Regular BSR';

the periodicBSR-Timer expires, in which case the BSR is referred below to as a 'Periodic BSR'.

NOTE 1: When a Regular BSR triggering events occur for multiple logical channels simultaneously, each logical channel triggers one separate Regular BSR.

For a Regular BSR, the MAC entity shall:

1> if the BSR is triggered for a logical channel for which logicalChannelSR-DelayTimerApplied with value true is configured by upper layers:

2> start or restart the logicalChannelSR-DelayTimer.

1> else:

2> if running, stop the logicalChannelSR-DelayTimer.

For Regular and Periodic BSR, the MAC entity shall:

1> if more than one LCG has data available for transmission when the MAC Packet Data Unit (PDU) containing the BSR is to be built:

2> report Long BSR for all LCGs which have data available for transmission.

1> else:

2> report Short BSR.

For a Padding BSR, the MAC entity shall:

1> if the number of padding bits is equal to or larger than the size of the Short BSR plus its subheader but smaller than the size of the Long BSR plus its subheader:

2> if more than one LCG has data available for transmission when the BSR is to be built:

3> if the number of padding bits is equal to the size of the Short BSR plus its subheader:

4> report a Short Truncated BSR of the LCG with the highest priority logical channel with data available for transmission.

3> else:

4> report a Long Truncated BSR of the LCG(s) with the logical channels having data available for transmission following a decreasing order of the highest priority logical channel, with or without data available for transmission, in each of these LCG(s), and in case of equal priority, in increasing order of Logical Channel Group Identifier (LCG ID).

2> else:

3> report a Short BSR.

1> else if the number of padding bits is equal to or larger than the size of the Long BSR plus its subheader:

2> report a Long BSR for all LCGs which have data available for transmission.

MAC PDU

A MAC PDU consists of one or more MAC subPDUs. Each MAC subPDU consists of one of the following:

A MAC subheader only, including padding;
A MAC subheader and a MAC Service Data Unit (SDU);
A MAC subheader and a MAC CE;
A MAC subheader and padding.

The MAC SDUs are of variable sizes.

Each MAC subheader corresponds to either a MAC SDU, a MAC CE, or padding.

A MAC subheader except for fixed sized MAC CE, padding, and a MAC SDU containing UL CCCH consists of the four header fields R/F/LCID/L. A MAC subheader for fixed sized MAC CE, padding, and a MAC SDU containing UL CCCH consists of the two header fields R/LCID.

This is illustrated in FIG. 4 depicting a diagram of an R/F/LCID/L MAC subheader with 8-bit L field.

This is further illustrated in FIG. 5 depicting an R/F/LCID/L MAC subheader with 16-bit L field.

This is further illustrated in FIG. 6 depicting an R/LCID MAC subheader.

The bits lengths of the 8-bits long octets in FIGS. 4-6 are illustrated by a bit scale on the top of the diagram.

MAC CEs are placed together. DL MAC subPDU(s) with MAC CE(s) is placed before any MAC subPDU with MAC SDU and MAC subPDU with padding as depicted in FIG. 6 Example of a DL MAC PDU, UL MAC subPDU(s) with MAC CE(s) is placed after all the MAC subPDU(s) with MAC SDU and before the MAC subPDU with padding in the MAC PDU as depicted in FIG. 7. The size of padding may be zero. FIG. 8 depicts an example of a UL MAC PDU.

A maximum of one MAC PDU may be transmitted per Transport Block (TB) per MAC entity.

Buffer Status Report MAC CEs

The BSR MAC CEs consist of either:

Short BSR format (fixed size); or

Long BSR format (variable size); or

Short Truncated BSR format (fixed size);

Long Truncated BSR format (variable size); or

Pre-emptive BSR format (variable size).

The BSR formats are identified by MAC subheaders with LCIDs as exemplified in FIGS. 4 and 5.

The fields in the BSR MAC CE are defined as follows:

LCG ID: The Logical Channel Group ID field identifies the group of logical channel(s) whose buffer status is being reported. The length of the field is 3 bits;

LCGi: For the Long BSR format, this field indicates the presence of the Buffer Size field for the logical channel group i. The LCGi field set to 1 indicates that the Buffer Size field for the logical channel group i is reported. The LCGi field set to 0 indicates that the Buffer Size field for the logical channel group i is not reported. For the Long Truncated BSR format, this field indicates whether logical channel group i has data available. The LCGi field set to 1 indicates that logical channel group i has data available. The LCGi field set to 0 indicates that logical channel group i does not have data available;

Buffer Size: The Buffer Size field identifies the total amount of data available according to the data volume calculation procedure in TSs 38.322 and 38.323 across all logical channels of a logical channel group after the MAC PDU has been built (i.e. after the logical channel prioritization procedure, which may result the value of the Buffer Size field to zero). The amount of data is indicated in number of bytes. The size of the Radio Link Control (RLC) and MAC headers are not considered in the buffer size computation. The length of this field for the Short BSR format and the Short Truncated BSR format is 5 bits. The length of this field for the Long BSR format and the Long Truncated BSR format is 8 bits. The values for the 5-bit and 8-bit Buffer Size fields are shown in 3GPP Tables 6.1.3.1-1 and 6.1.3.1-2, respectively. For the Long BSR format and the Long Truncated BSR format, the Buffer Size fields are included in ascending order based on the LCGi. For the Long Truncated BSR format the number of Buffer Size fields included is maximised, while not exceeding the number of padding bits. For the Pre-emptive BSR, the Buffer Size field identifies the total amount of the data expected to arrive at the Integrated Access and Backhaul Mobile Termination (IAB-MT) of the node where the Pre-emptive BSR is triggered. Pre-emptive BSR is identical to the Long BSR format.

NOTE 1: For the Pre-emptive BSR, if configured, the LCGs to be reported, the expected data volume calculation, the exact time to report Pre-emptive BSR and the associated LCH are left to implementation.

NOTE 2: The mapping of LCGs between the ingress and egress links of an Integrated Access and Backhaul (IAB) node for purposes of determining expected change in occupancy of IAB-MT buffers, e.g. to be reported as Pre-emptive BSR, is left to implementation.

NOTE 3: The number of the Buffer Size fields in the Long BSR and Long Truncated BSR format can be zero.

FIG. 9 depicts short BSR and Short Truncated BSR MAC CE in 3GPP TS 38.321 v16.2.1.

FIG. 10 depicts Long BSR, Long Truncated BSR, and Pre-emptive BSR MAC CE in 3GPP TS 38.321 v16.2.1.

The bits lengths of the 8-bits long octets in FIGS. 9 and 10 are illustrated by a bit scale on the top of the diagram.

In case of transmitting a BSR in Msg3 or MsgA together with CCCH (RRC message) and data, the MAC PDU would consist of the following sub headers and SDUs:

R/LCID Mac subheader (1 byte)

CCCH (6 or 8 bytes)

R/F/LCID Mac subheader (2 bytes including length field)

MAC SDU of user data (depending on grant size)

R/LCID Mac subheader (1 byte)

Short BSR MAC CE (1 byte)

This is illustrated in FIG. 11. FIG. 11 is an illustration of MAC PDU multiplexing RRC, user data and BSR.

SUMMARY

As a part of developing embodiments herein the inventors identified a problem which first will be discussed.

The BSR triggering conditions for SDT have not been agreed in 3gpp and the legacy conditions may not be efficient given the small size of grants envisioned.

A second aspect of transmitting a BSR multiplexed with CCCH and user data on a relatively small grant is that the overhead can be considerable.

An object of embodiments is to improve the performance of wireless communications network using SDT.

According to an aspect of embodiments herein, the object is achieved by a method performed by a User Equipment, UE, for controlling an indication of user data in a buffer of the UE. The user data in the buffer is for Small Data Transmission, SDT, in a wireless communications network when the UE is in inactive mode.

The UE obtains pending user data for SDT into the buffer of the UE.

Based on a threshold value related to an amount of user data for SDT, determining whether or not to include an indication into a first uplink grant allocation transmission for the SDT to be transmitted to a network node. The indication would indicate that user data is in the buffer.

When an indication of user data in a buffer is not included in the first uplink grant allocation transmission when transmitted, this indicates to the network node that the amount of data left in the buffer is less than the threshold value minus the first allocated grant transmission size, and when an indication of user data in a buffer is included in the first uplink grant allocation transmission when transmitted, the indication indicates to the network node how many further transmissions that are needed for transmitting a rest of the pending data not included when transmitted in the first uplink grant allocation transmission.

According to another aspect of embodiments herein, the object is achieved by a User Equipment, UE, configured to control an indication of user data in a buffer of the UE for Small Data Transmission, SDT, in a wireless communications network when the UE is in inactive mode. The UE further is configured to:

Obtain pending user data for SDT into a buffer of the UE, based on a threshold value related to an amount of user data for SDT, determine whether or not to include an indication of user data in the buffer into a first uplink grant allocation transmission for the SDT to be transmitted to a network node, when an indication of user data in a buffer is not included in the first uplink grant allocation transmission when transmitted, this is adapted to indicate to the network node that the amount of data left in the buffer is less than the threshold value minus the first allocated grant transmission size, and when an indication of user data in a buffer is included in the first uplink grant allocation transmission when transmitted, the indication is adapted to indicate to the network node how many further transmissions that are needed for transmitting a rest of the pending data not included when transmitted in the first uplink grant allocation transmission.

It is furthermore provided herein a computer program product comprising instructions, which, when executed on at least one processor, cause the at least one processor to carry out any of the methods above, as performed by the apparatus. It is additionally provided herein a computer-readable storage medium, having stored there on a computer program product comprising instructions which, when executed on at least one processor, cause the at least one processor to carry out the method according to any of the methods above, as performed by the apparatus.

BRIEF DESCRIPTION OF THE DRAWINGS

Examples of embodiments herein are described in more detail with reference to attached drawings in which.

DETAILED DESCRIPTION

Example of embodiments herein relate to Rules of inclusion of an indication of user data in a buffer such as e.g. an BSR in SDT.

Example of embodiments herein provide details on how and in which cases an indication of user data in a buffer of a UE, referred to as a UE buffer, such as e.g. an BSR should be included in a first uplink grant allocation transmission for the SDT to be transmitted to a network node such as e.g. Msg3 and/or MsgA in the context of Small Data Enhancement for NR.

It may be assumed that the UE is camping in a cell in inactive mode such as RRC_INACTIVE and may move to connected mode such as RRC_CONNECTED to perform some of the data transfers required.

Embodiments herein comprises at least some of the following advantages:

They define an indication of user data in a buffer such as e.g. an BSR to e.g. indicate the number of transmissions needed to empty the buffer using a same grant size e.g. to allow for more efficient BSR encoding. An indication of user data in a buffer may e.g. be an indication of user data in the UE buffer such as e.g. the existing and/or anticipated user data in the UE buffer.

They allow configuring a data volume threshold under which no indication of user data in a buffer such as no BSR is transmitted, this allows more data to be transmitted and a network node such as a gNB still has knowledge of what size grant it needs to give for the UE to fit all remaining data in the next transmission.

They allow transmitting an indication of user data in a buffer such as a BSR only when the amount of data in the buffer is larger than a configured "normal" value.

They allow transmitting an indication of user data in a buffer such as a BSR also for lower priority LCGs or LCGs different from the LCGs configured for SDT.

They may remove the MAC subheader before an indication of user data in a buffer such as a BSR to reduce the overhead leading to more efficient transmissions.

Figure 1:
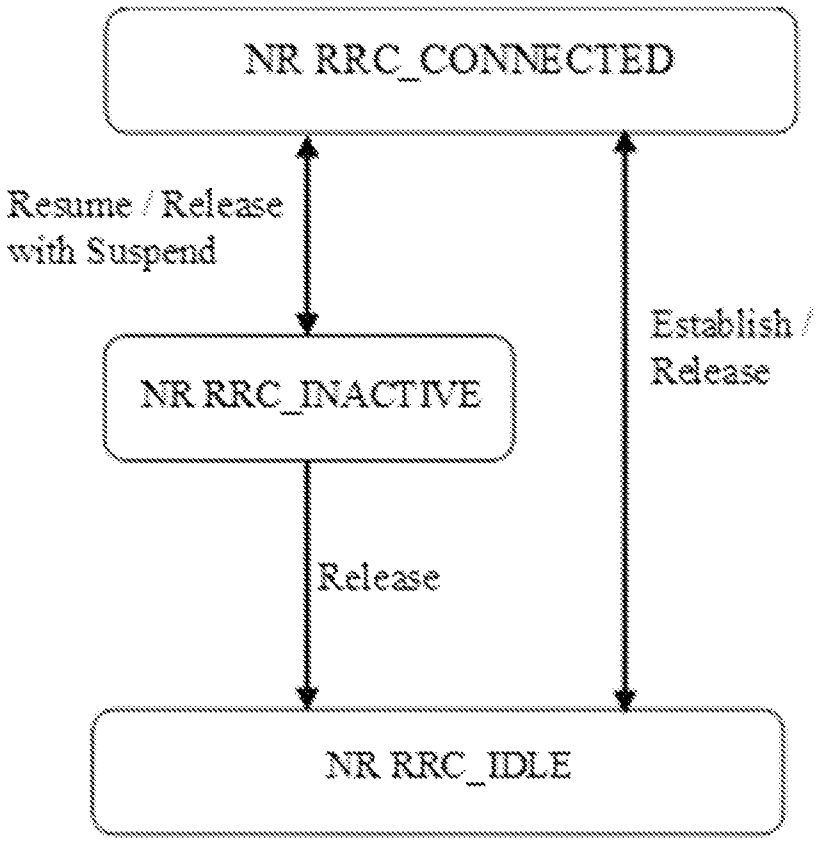
FIG. 1 is a schematic block diagrams illustrating prior art.
Figure 2:
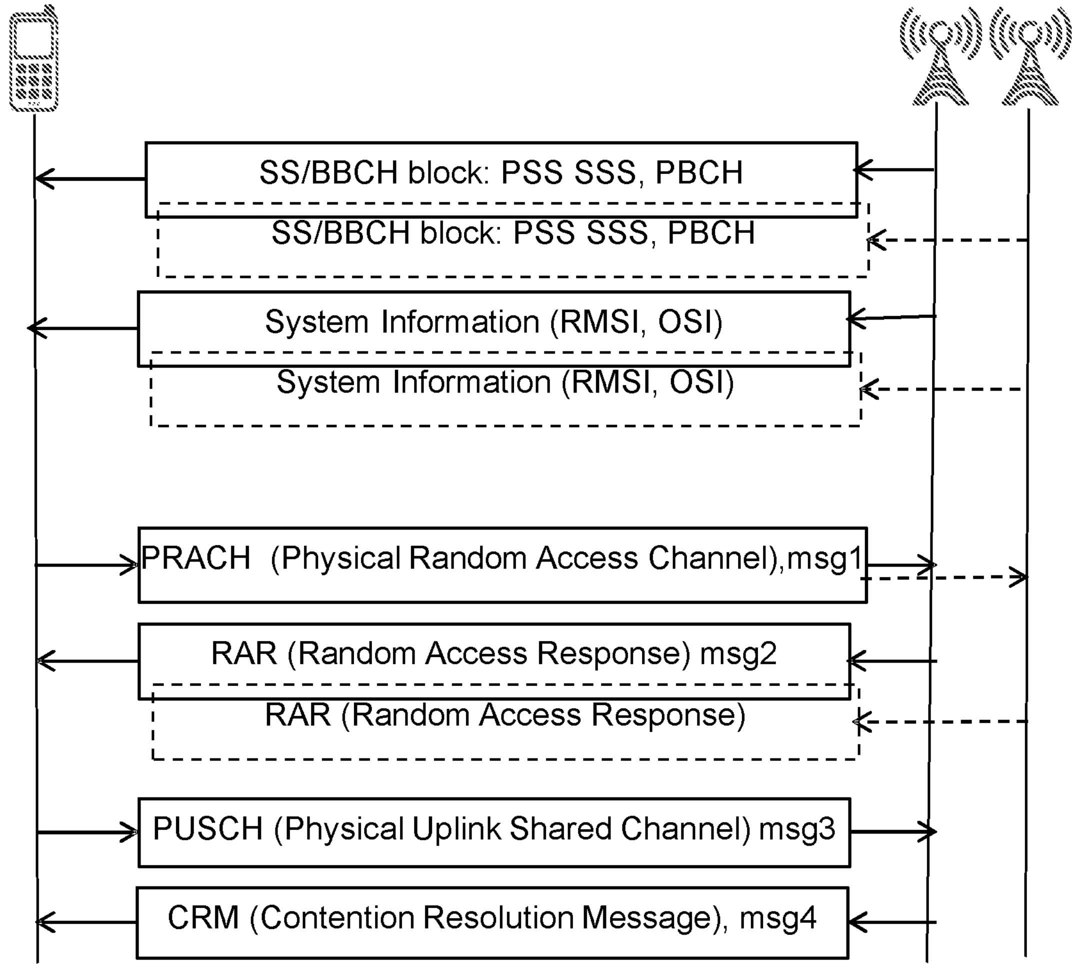
FIG. 2 is a schematic block diagrams illustrating prior art.
Figure 3:
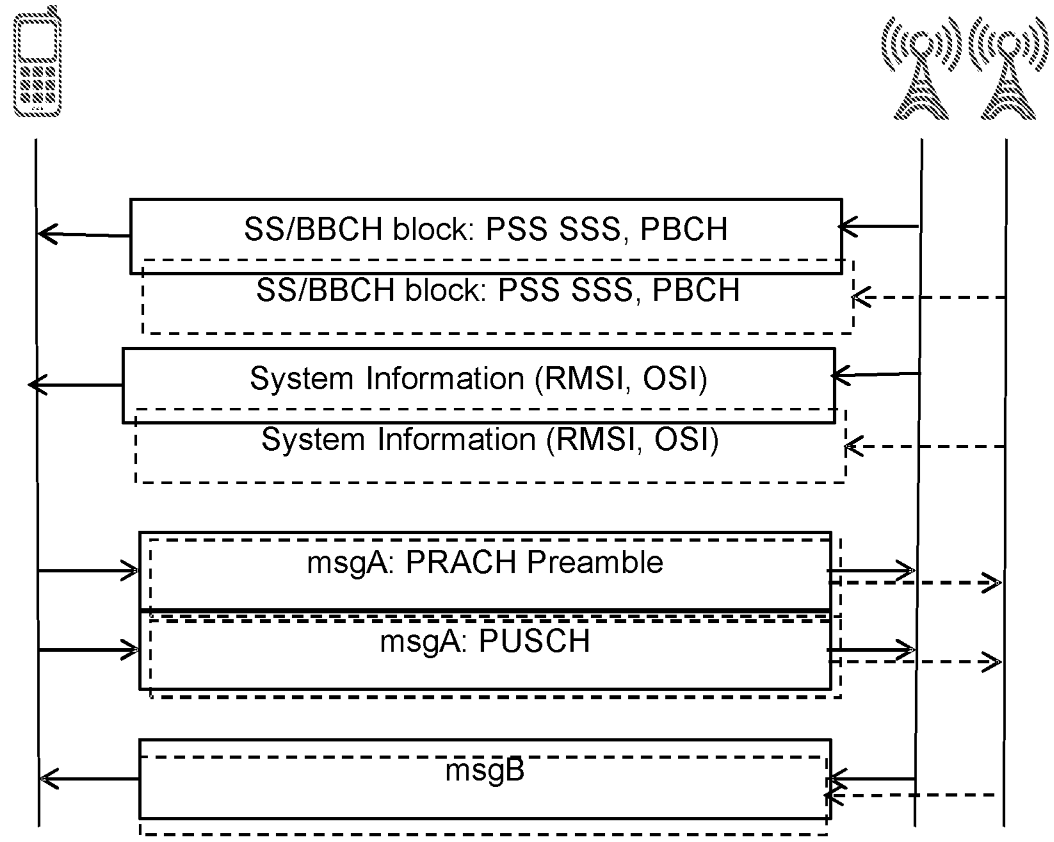
FIG. 3 is a schematic block diagrams illustrating prior art.
Figure 4:
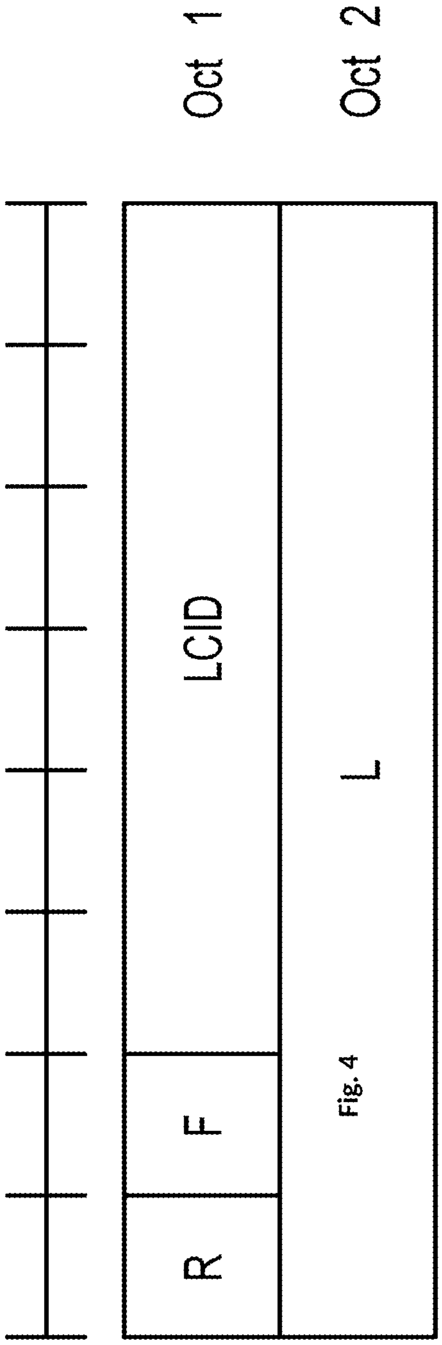
FIG. 4 is a schematic block diagrams illustrating prior art.
Figure 5:
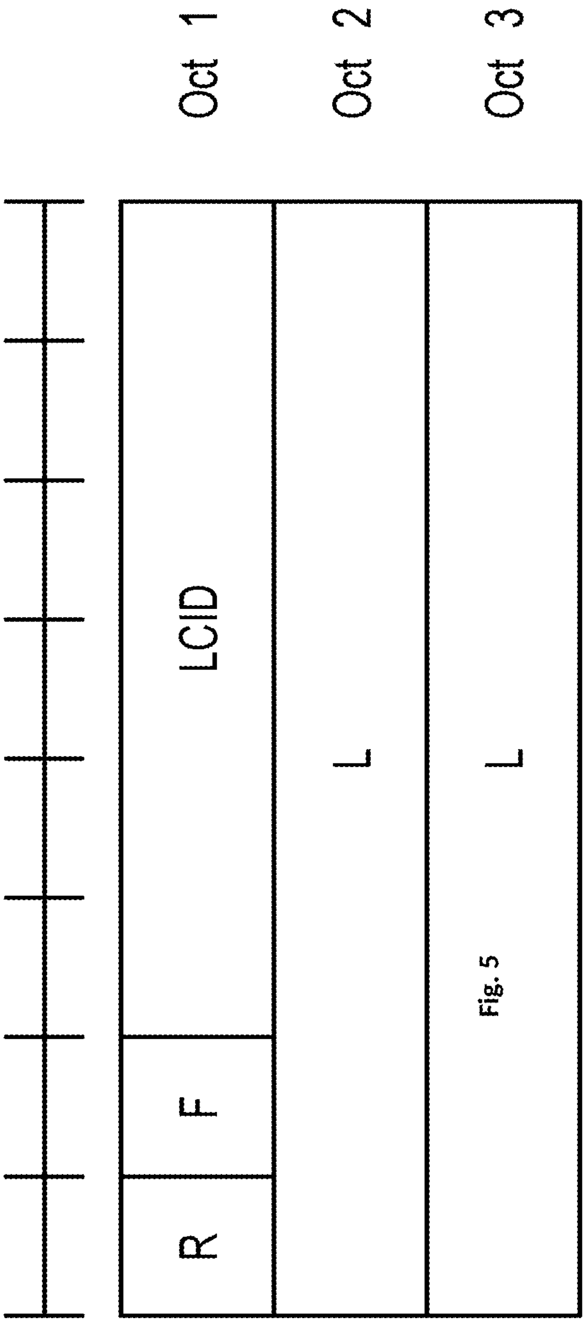
FIG. 5 is a schematic block diagrams illustrating prior art.
Figure 6:
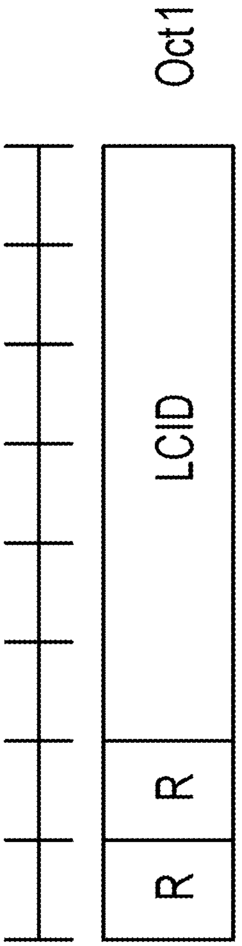
FIG. 6 is a schematic block diagrams illustrating prior art.
Figure 7:
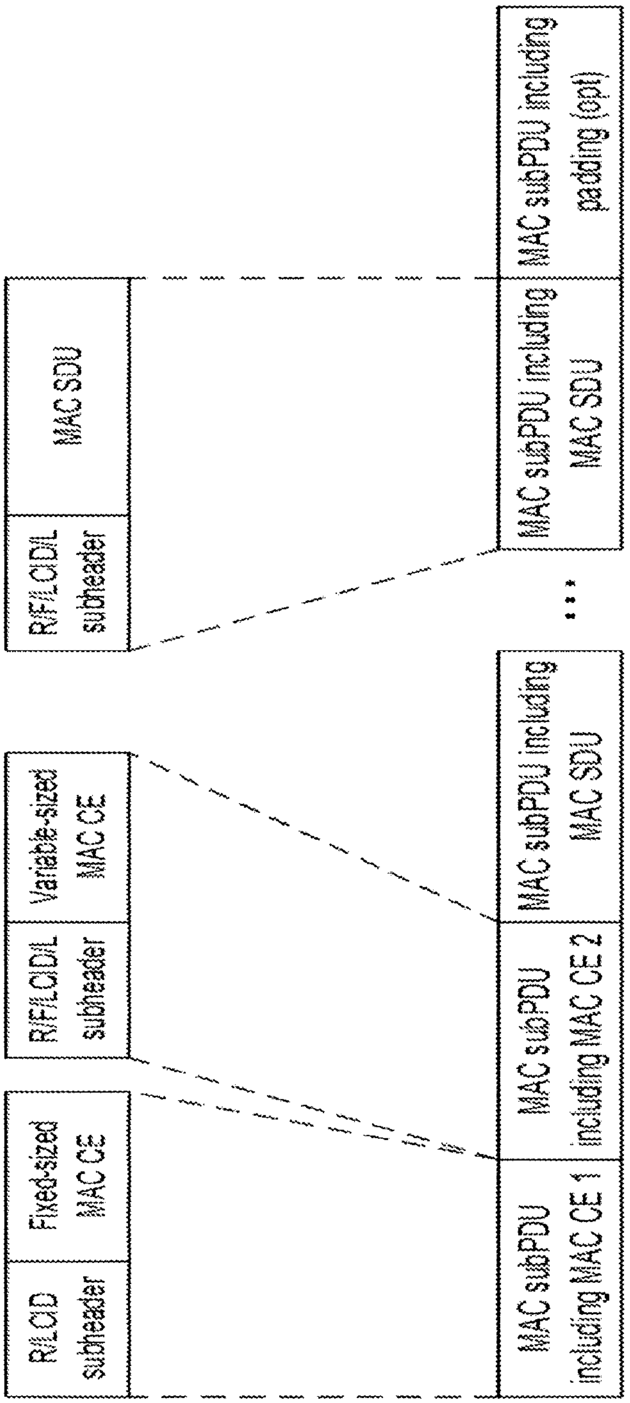
FIG. 7 is a schematic block diagrams illustrating prior art.
Figure 8:
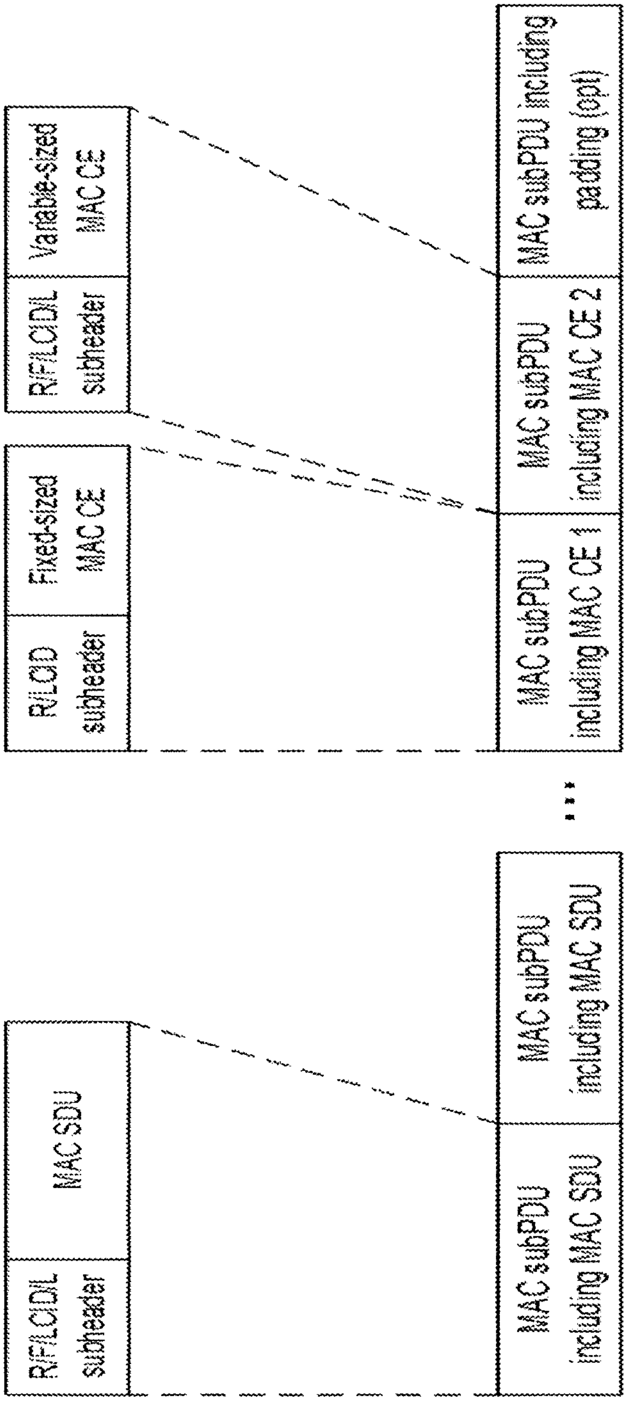
FIG. 8 is a schematic block diagrams illustrating prior art.
Figure 9:
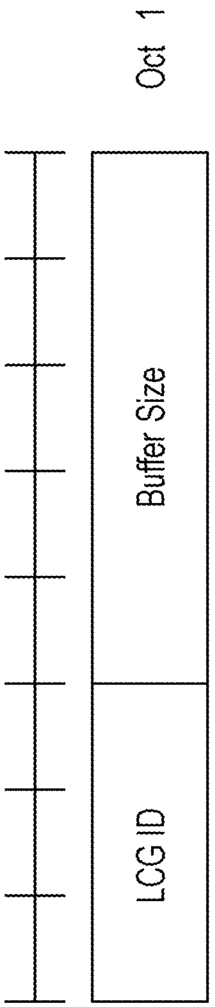
FIG. 9 is a schematic block diagrams illustrating prior art.
Figure 10:
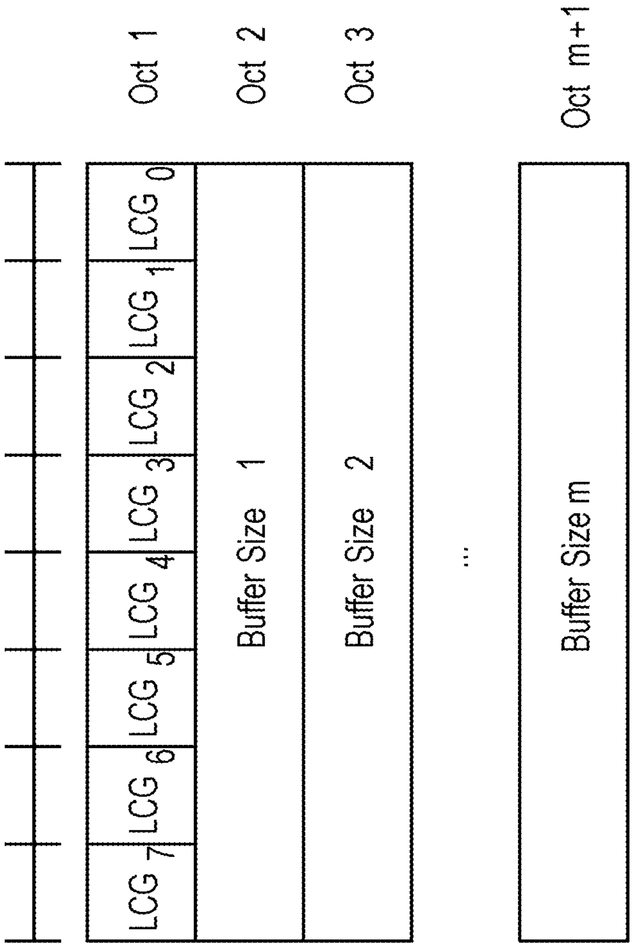
FIG. 10 is a schematic block diagrams illustrating prior art.
Figure 11:
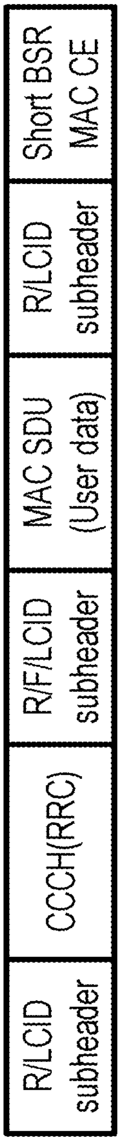
FIG. 11 is a schematic block diagrams illustrating prior art.
Figure 12:
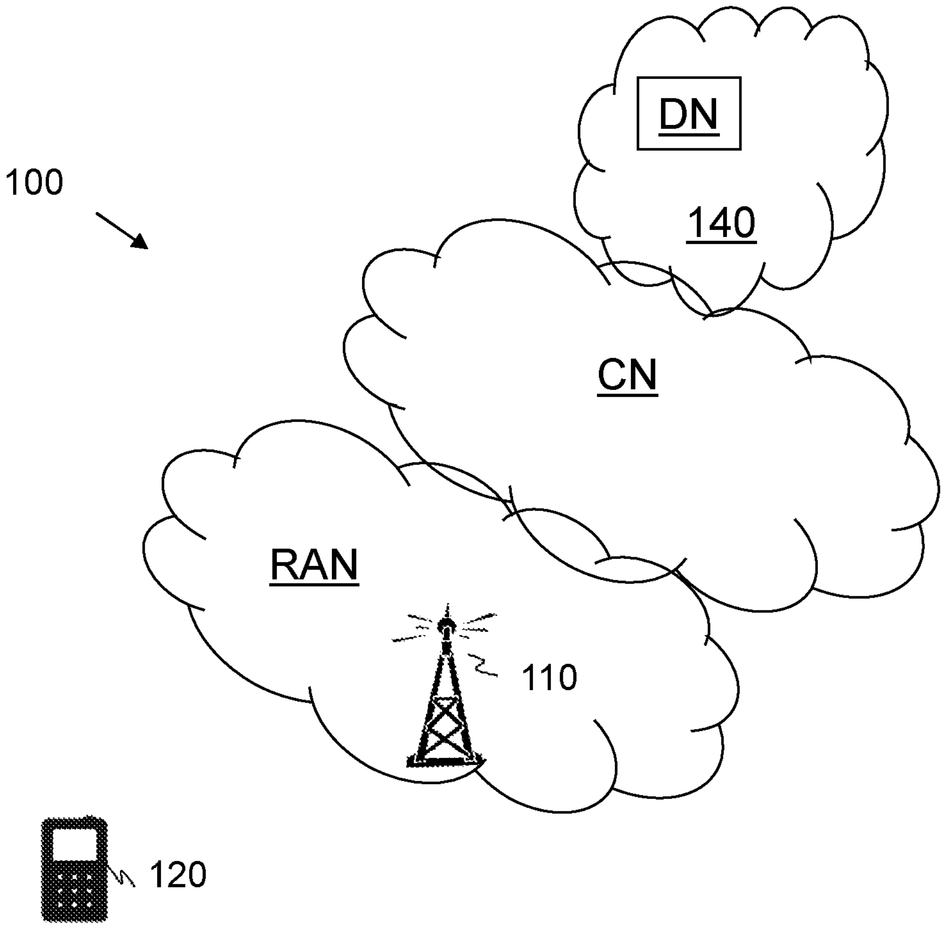
FIG. 12 is a schematic block diagram illustrating embodiments of a radio communications network.

FIG. 12 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, LTE, LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Network nodes such as a network node 110 operate in the wireless communications network 100, by means of antenna beams, referred to as beams herein. The RAN node 110 e.g. provides a number of cells referred to as cell1 and cell2, and may use these cells for communicating with e.g. a UE 120. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within any of cell1 and cell2 served by the network node 110 depending e.g. on the radio access technology and terminology used.

User Equipments operate in the wireless communications network 100, such as a UE 120. The UE 120 may provide radio coverage by means of a number of antenna beams, also referred to as beams herein.

The UE 120 may e.g. be an NR device, a mobile station, a wireless terminal, an NB-IoT device, an eMTC device, an NR RedCap device, a CAT-M device, a WiFi device, an LTE device and an a non-access point (non-AP) STA, a STA, that communicates via a base station such as e.g. the network node 110, one or more Access Networks (AN), e.g. RAN, to one or more CNs. It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

CN nodes operates in the wireless communications network 100. The CN node may e.g. be an Access and Mobility management Function (AMF) node or a Session Management Function (SMF) node.

Methods herein may in one aspect be performed by the be performed by the UE 120. As an alternative, a Distributed Node (DN) and functionality, e.g. comprised in a cloud 140, as shown in FIG. 12 may be used for performing or partly performing the methods.

Figure 13:
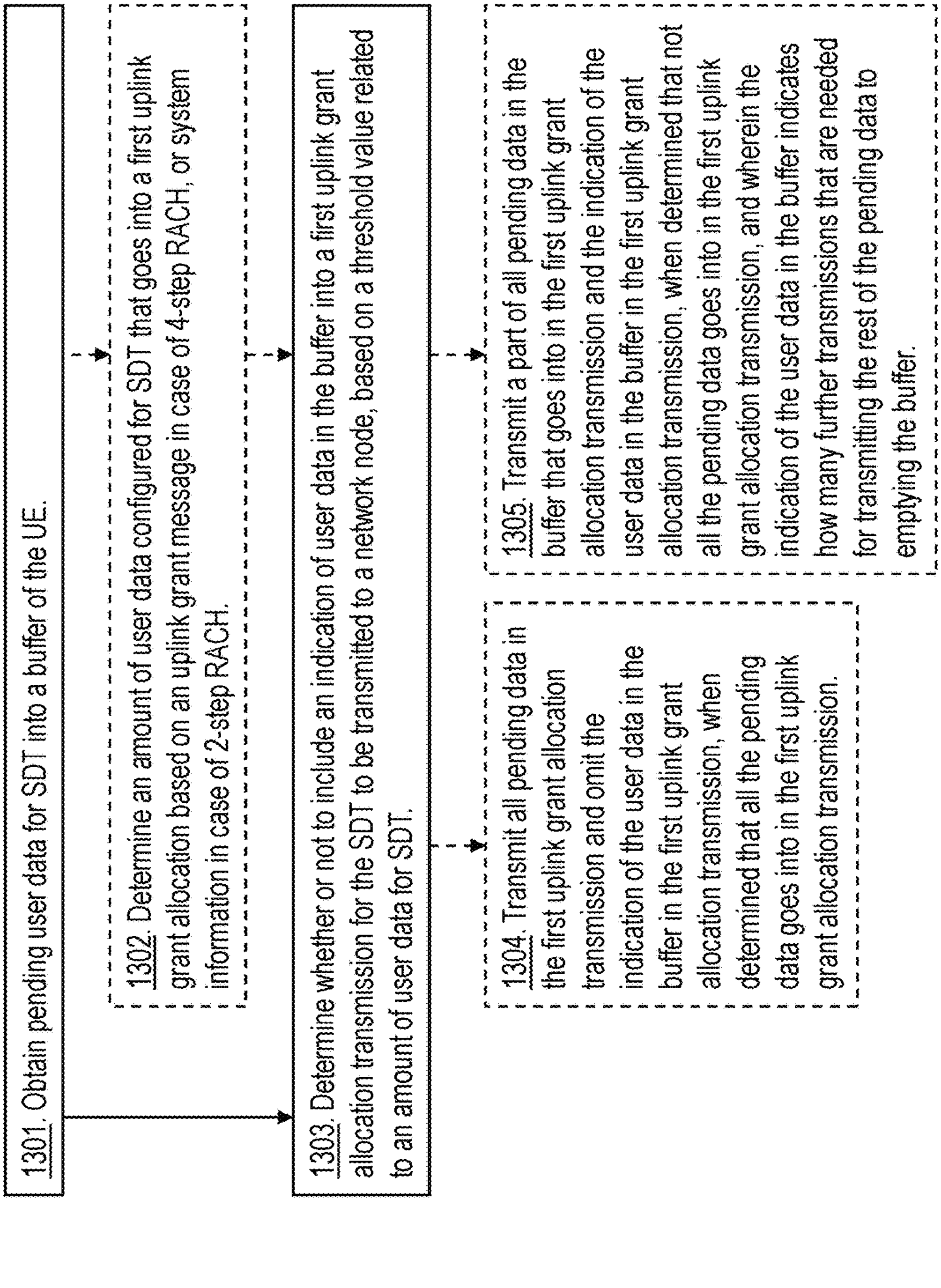
FIG. 13 is a flowchart depicting embodiments of a method in a UE.

FIG. 13 shows an example method performed by the UE 120 for controlling an indication of user data in a buffer of the UE 120. The user data in the buffer for SDT in the wireless communications network 100, when the UE 120 is in inactive mode. The method comprises any one or more out of the actions below. Optional actions are referred to as dashed boxes in FIG. 13.

Action 1301

The UE 120 obtains pending user data for SDT into a buffer of the UE 120.

This means that the UE 120 may receive data in its buffer when the UE 120 is in inactive mode, which data is to be transmitted as SDT.

Action 1302

In some embodiments, the UE 120 determines an amount of user data configured for SDT that goes into a first uplink grant allocation based on, also referred to as derived from, any one out of:

- An uplink grant message, Msg2, in case of 4-step RACH. The Msg2 may contain a grant for a specific amount of user data configured for SDT.
- Or as an alternative, System Information, SI, in case of 2-step RACH. This may e.g., be since the SI comprises information about the amount of data in the PUSCH transmission of message A in the 2-step RACH procedure.

Action 1303

Based on a threshold value related to the amount of user data for SDT, the UE 120 determines whether or not to include an indication into a first uplink grant allocation transmission for the SDT to be transmitted to the network node 110. The indication indicates user data in the buffer. This may mean that the indication in the first uplink grant allocation transmission indicates that there is user data for SDT in the UE buffer to be transmitted to the network node 110.

- When an indication of user data in a buffer is not included in the first uplink grant allocation transmission when transmitted, this indicates to the network node 110 that the amount of data left in the buffer is less than the threshold value minus the first allocated grant transmission size.
- When an indication of user data in a buffer is included in the first uplink grant allocation transmission when transmitted, the indication indicates to the network node 110 how many further transmissions that are needed for transmitting a rest of the pending data not included when transmitted in the first uplink grant allocation transmission.

In some embodiments, the indication of user data in the buffer is represented by a BSR. That is the indication of user data in the buffer may in some embodiments be a BSR.

In some embodiments, the indication of the user data in the buffer in the first uplink grant allocation transmission further indicates data available on a logical channel or logical channel group not part of the SDT DRB configuration.

Action 1304

- When determined that an indication of user data in the buffer shall not be included in the first uplink grant allocation transmission, the UE 120 may transmit the first uplink grant allocation transmission without including the indication of user data in the buffer. As mentioned above, this indicates to the network node 110 that the amount of data left in the buffer is less than the threshold value minus the first allocated grant transmission size.

In these embodiments, when determined that all the pending data goes into in the first uplink grant allocation transmission, the UE 120 transmits to the network node 110, all the pending data in the first uplink grant allocation transmission and omits the indication of the user data in the buffer in the first uplink grant allocation transmission.

In some embodiments, the threshold value related to an amount of user data for SDT is represented by a threshold value relating to all the pending data that goes into the first uplink grant allocation transmission.

Action 1305

- When an indication of user data in a buffer is included in the first uplink grant allocation transmission when transmitted, the UE 120 may transmit the first uplink grant allocation transmission including the indication of user data in the buffer. As mentioned above, this indication indicates to the network node 110 how many further transmissions that are needed for transmitting a rest of the pending data not included when transmitted in the first uplink grant allocation transmission.

In these embodiments, when determined that not all the pending data goes into in the first uplink grant allocation transmission, the UE 120 transmits to the network node 110, a part of all pending data in the buffer that goes into in the first uplink grant allocation transmission and the indication of the user data in the buffer in the first uplink grant allocation transmission. The indication of the user data in the buffer indicates to the network node 110 how many further transmissions that are needed for transmitting the rest of the pending data to emptying the buffer.

In some embodiments, the threshold value related to an amount of user data for SDT is represented by a threshold value relating to all the pending data that goes into the first uplink grant allocation transmission.

The method will now be further explained and exemplified in below embodiments. These below embodiments may be combined with any suitable embodiment as described above.

In an example of some first embodiments the UE 120 determines the amount of user data configured for SDT that can fit in the first uplink grant allocation. This may e.g. be derived from an UL Grant in Msg2 in case of 4-step RACH, or from System Information in case of 2-step RACH. This relates to Action 1302 described above.

The UE 120 then determines if all the pending data can fit in this transmission. This relates to Action 1303 described above. In this example the amount of pending data can fit in is the threshold value.

In case it cannot fit, the UE 120 will include the indication of user data in a buffer such as the BSR to inform the network node 110 e.g. about how many further transmissions are needed to empty the buffer. This relates to Action 1305 described above. This may be performed by e.g. using the current allocation as reference, or towards the threshold value such as a configured threshold value. The information conveyed to the network node 110 may include an adjustment due to the payload size(s) needed to include an indication of user data in a buffer such as a BSR.

In case the complete UE 120 buffer for data configured for SDT can be sent in the first allocation, an indication of user data in a buffer such as a BSR is not included, also referred to as the indication is omitted. This relates to Action 1304 described above. The network node 110 such as a gNB may then assume that the first transmission is sufficient, e.g. all data from the UE 120 uplink buffer have been transmitted in the first transmission.

As an example of the first embodiments, the number of transmissions needed to empty the buffer given the current grant size, e.g. the grant size for msg3 or MsgA, may be coded using R-bits in the MAC subheader of the R/LCID preceding the CCCH and in the R/F/LCID subheader preceding the MAC SDU. For example, setting one of the R-bits to one indicates that one transmission will be sufficient to empty the buffer while setting both R-bits to one indicates that two transmissions are needed to empty the buffer.

Example of some second embodiments. In a further embodiment, the threshold value related to an amount of user data for SDT comprises two independent thresholds, a first threshold value and a second threshold value. They may e.g. be configured through System Information (SI) or during any previous interaction between the UE 120 and the network node 110 such as a gNB. E.g. through direct UE-specific configuration. In some embodiments, the first threshold value, Data Volume Threshold 1 (DVT1) determines if the UE 120 is allowed to initiate SDT, whereas the second threshold, Data Volume Threshold 2 (DVT2), if configured, determines if the UE 120 may include BSR in the first uplink grant allocation transmission such as Msg3 or MsgA. In other words, if Payload (PL) is the amount of pending data in the UE 120 buffer after the first uplink grant allocation transmission such as the Msg3 or MsgA transmission, and if DVT1>DVT2, the following three cases arises:

1. PL<DVT2<DVT1-> the UE 120 may initiate SDT and does not include BSR.
2. DVT2<PL<DVT1-> the UE 120 may initiate SDT, if SDT is initiated a BSR is included in the first uplink grant allocation transmission such as Msg3 or MsgA.
3. DVT2<DVT1<PL-> the UE 120 is not allowed to initiate SDT and performs a legacy access instead.

The above second embodiment may also include a variant when a rule for where an indication of user data in a buffer such as the BSR is not included, or when a triggered indication of user data in a buffer such as the BSR is cancelled, for example as a result from when all data for SDT transmission can be accommodated in the UL transmission although DVT2<PL<DVT1.

Example of some third embodiments. In a further embodiment, the UE 120 informs the network node 110 about a typical packet size, e.g.: a sensor with a repetitive traffic pattern. In the following example accesses, if the UE 120 sends a message corresponding to this typical packet size, regardless of its size, it does not include a BSR. The network node 110 such as a gNB then assumes the typical packet size is correct and schedules the appropriate number of uplink and possible downlink transmissions in RRC_INACTIVE, or the appropriate procedure, to deliver that amount of data. The UE 120 includes BSR in Msg3 or MsgA only if the pending packet has a different size than the configured typical one. In one example the typical packet size is used as threshold DVT2 in the second embodiments.

Example of some fourth embodiments. In a further embodiment, the network node 110 such as a gNB receives information about typical packet size that a particular UE sends during small data transmission procedure from a node other than the UE 120. The information is e.g. received, in a subscription information or another information stored in core network nodes or otherwise deduced by core network nodes. See e.g. the third embodiments where the UE 120 signals this information to the network node 110 such as a gNB. In one example the network node 110 such as a gNB deduces the typical packet size based on the observed traffic patterns. This data size is indicated to the UE 120 either as part of existing RRC signaling or other type of dedicated signaling. The UE 120 uses this indication as the threshold when considering whether to initiate small data transmission and whether to include a BSR. In one example the threshold determined in this way is used as DVT2 in the second embodiments.

Example of some fifth embodiments. In another further embodiment, the triggering of the indication of user data in a buffer such as the BSR is e.g. done only for data available on a logical channel or logical channel group not part of the SDT DRB configuration, where the triggering also may be specified to occur for logical channels with lower or equal priority compared to the existing data for SDT.

In this case, either by specification or by configuration, the UE 120 may be allowed to include an indication of user data in a buffer such as the BSR, e.g. if there is room in the MAC PDU for SDT transmission after SDT data has been multiplexed there. Alternatively, it is always allowed multiplexing a BSR allowing for segmentation and subsequent transmissions.

Or in this case, if the UE 120 must trigger another request for UL resources using a legacy procedure for LCHs not configured for SDT. The reporting, triggering or multiplexing may be subject to a volume or datagram size threshold.

Example of some sixth embodiments. In another alternative embodiment, the sixth embodiment, the indication of user data in a buffer such as the BSR triggered either by configuration or specification, may only be due to new logical channel data, or remaining data in the buffer for the logical channels configured for SDT, and for where the buffer information in the BSR then may contain information only on data available of logical channel groups configured for SDT. In one example, even though several LCGs contain data, only a short BSR for the LCG configured for SDT is reported. Alternatively, the indication of user data in a buffer such as the BSR may contain information of all logical channels, or only for logical channels for which BSR triggering and/or reporting has been configured. In one example, when several LCGs have data, a short BSR is reported aggregating all data across all LCGs. The reporting, triggering or multiplexing may be subject to a volume or datagram size threshold.

Example of some seventh embodiments. In a separate embodiment relating to the format of the indication of user data in a buffer such as in this example the BSR, then the R/LCID MAC subheader preceding the short BSR is removed, thereby removing some overhead and making the transmission more efficient. This may be done if the short BSR is the only possible MAC CE that may be included, making the LCID unnecessary. Instead it may be deduced from the size of the grant how much of this is already occupied by the R/LCID subheader, the CCCH, the R/F/LCID subheader and the MAC SDU of user data. If the sum of these leave one byte of room in the grant, then the last byte may be the short BSR MAC CE. This is illustrated in FIG. 14.

Figure 14:
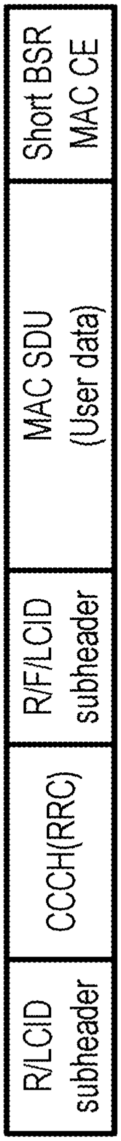
FIG. 14 is a schematic block diagram depicting an embodiment herein.

FIG. 14 depicts an example of MAC PDU where R/LCID subheader for BSR is removed.

In a variant of the seventh embodiments, one or more of the of the R bits in the R/LCID subheader of the CCCH and the R/F/LCID subheader for the MAC SDU may be used to indicate the presence of a short BSR MAC CE without subheader. For example, if the R-bit in the R/LCID subheader is set to 1, then the last byte in the MAC PDU is a short BSR MAC CE. In another example, if both R-bits are set to 1, then the last byte in the MAC PDU is a short BSR MAC CE.

Figure 15A:
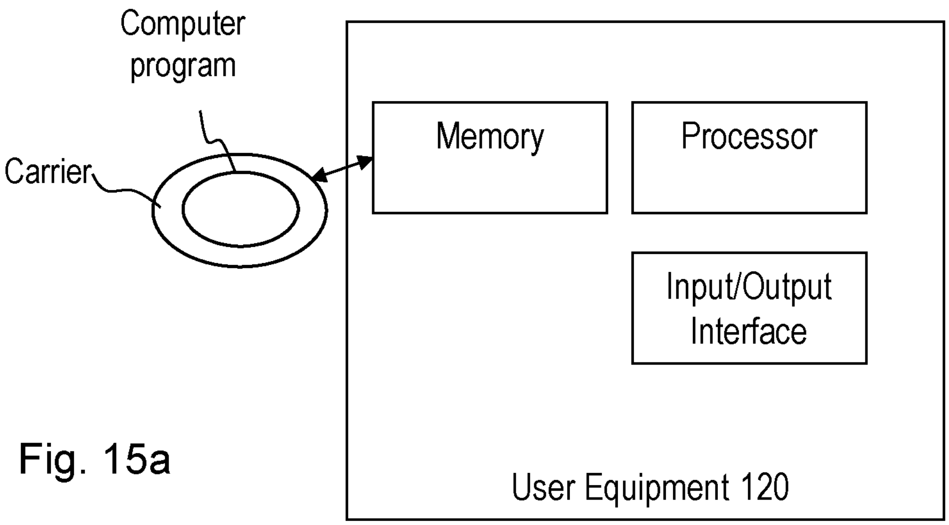
FIGS. 15 *a* and *b* are schematic block diagrams illustrating embodiments of a UE.
Figure 15B:
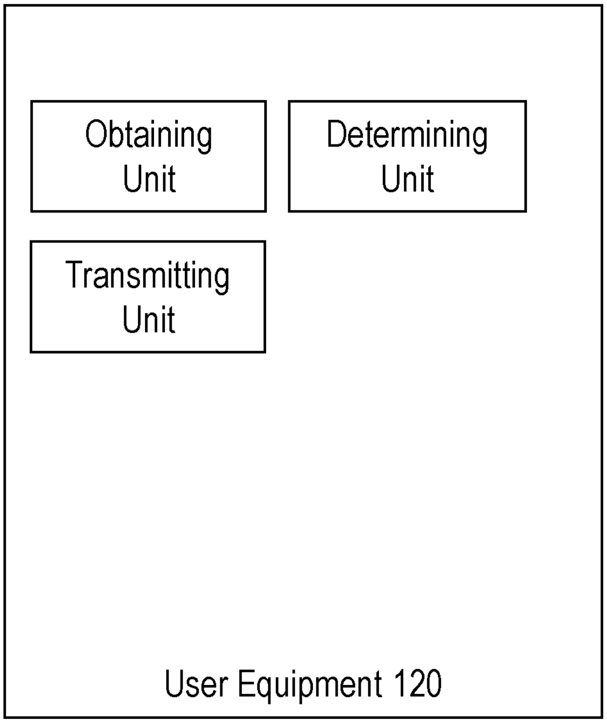

FIGS. 15*a* and 15*b* show an example of arrangement in the UE 120.

The UE 120 may comprise an input and output interface configured to communicate with each other. The input and output interface may comprise a wireless receiver (not shown) and a wireless transmitter (not shown).

The UE 120 may comprise an obtaining unit, a determining unit, and a transmitting unit to perform the method actions as described herein.

The embodiments herein may be implemented through a respective processor or one or more processors, such as the processor of a processing circuitry in the UE 120 depicted in FIG. 15*a*, together with computer program code for performing the functions and actions of the embodiments herein. The program code mentioned above may also be provided as a computer program product, for instance in the form of a data carrier carrying computer program code for performing the embodiments herein when being loaded into the UE 120. One such carrier may be in the form of a CD ROM disc. It is however feasible with other data carriers such as a memory stick. The computer program code may furthermore be provided as pure program code on a server and downloaded to the UE 120.

The UE 120 may further comprise respective a memory comprising one or more memory units. The memory comprises instructions executable by the processor in the UE 120.

The memory is arranged to be used to store instructions, data, configurations, and applications to perform the methods herein when being executed in the UE 120.

In some embodiments, a computer program comprises instructions, which when executed by the at least one processor, cause the at least one processor of the UE 120 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the UE 120, described below may refer to a combination of analog and digital circuits, and/or one or more processors configured with software and/or firmware, e.g. stored in the UE 120, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word “comprise” or “comprising” it shall be interpreted as non-limiting, i.e. meaning “consist at least of”.

The embodiments herein are not limited to the above described preferred embodiments. Various alternatives, modifications and equivalents may be used.

Below, some example embodiments 1-12 are shortly described. See e.g. FIGS. 12, 13, 15*a*, and 15*b*.

It should be noted that the below numbering of the embodiments is not correlated to the numbering of the embodiments as described above.

Embodiment 1. A method performed by a User Equipment, UE, 120, e.g. for controlling an indication of user data in a buffer of the UE 120 for Small Data Transmission, SDT, in a wireless communications network 100 when the UE 120 is in inactive mode, the method comprising any one or more out of:

obtaining 1301 pending user data for SDT into a buffer of the UE 120, based on a threshold value related to an amount of user data for SDT, determining 1303 whether or not to include an indication of user data in the buffer into a first uplink grant allocation transmission for the SDT to be transmitted to a network node 110, when an indication of user data in a buffer is not included in the first uplink grant allocation transmission when transmitted, this indicates to the network node 110 that the amount of data left in the buffer is less than the threshold value minus the first allocated grant transmission size, and when an indication of user data in a buffer is included in the first uplink grant allocation transmission when transmitted, the indication indicates to the network node 110 how many further transmissions that are needed for transmitting a rest of the pending data not included when transmitted in the first uplink grant allocation transmission.

Embodiment 2. The method according to embodiment 1, wherein the indication of user data in the buffer is represented by a Buffer Status Report, BSR.

Embodiment 3. The method according to any of the embodiments 1-2, wherein the threshold value related to an amount of user data for SDT is represented by a threshold value relating to all the pending data that goes into the first uplink grant allocation transmission, and when determined that all the pending data goes into in the first uplink grant allocation transmission, transmitting 1304 to the network node 110, all the pending data in the first uplink grant allocation transmission, and omitting the indication of the user data in the buffer in the first uplink grant allocation transmission, when determined that not all the pending data goes into in the first uplink grant allocation transmission, transmitting 1305 to the network node 110, a part of all pending data in the buffer that goes into in the first uplink grant allocation transmission and the indication of the user data in the buffer in the first uplink grant allocation transmission, wherein the indication of the user data in the buffer indicates to the network node 110 how many further transmissions that are needed for transmitting the rest of the pending data to emptying the buffer.

Embodiment 4. The method according to according to any of the embodiments 1-3, wherein:

the indication of the user data in the buffer in the first uplink grant allocation transmission further indicates data available on a logical channel or logical channel group not part of the SDT Data Radio Bearer, DRB, configuration.

Embodiment 5. The method according to according to any of the embodiments 1-4, further comprising:

determining 1302 an amount of user data configured for Small data Transmission, SDT, that goes into a first uplink grant allocation based on any one out of:

an uplink grant message, Msg2, in case of 4-step Random Access Channel, RACH, or System Information, SI, in case of 2-step RACH.

Embodiment 6. A computer program comprising instructions, which when executed by a processor, causes the processor to perform actions according to any of the embodiments 1-5.

Embodiment 7. A carrier comprising the computer program of embodiment 6, wherein the carrier is one of an electronic signal, an optical signal, an electromagnetic signal, a magnetic signal, an electric signal, a radio signal, a microwave signal, or a computer-readable storage medium.

Embodiment 8. A User Equipment, UE, 120, e.g. configured to control an indication of user data in a buffer of the UE 120 for SDT in a wireless communications network 100 when the UE 120 is in inactive mode, wherein the UE 120 further is configured to any one or more out of:

obtain pending user data for SDT into a buffer of the UE 120, e.g. by means of the obtaining unit in the UE 120, based on a threshold value related to an amount of user data for SDT, determine whether or not to include an indication of user data in the buffer into a first uplink grant allocation transmission for the SDT to be transmitted to a network node 110, e.g. by means of the determining unit in the UE 120, when an indication of user data in a buffer is not included in the first uplink grant allocation transmission when transmitted, this is adapted to indicate to the network node 110 that the amount of data left in the buffer is less than the threshold value minus the first allocated grant transmission size, and when an indication of user data in a buffer is included in the first uplink grant allocation transmission when transmitted, the indication is adapted to indicate to the network node 110 how many further transmissions that are needed for transmitting a rest of the pending data not included when transmitted in the first uplink grant allocation transmission.

Embodiment 9. The UE 120 according to embodiment 8, wherein the indication of user data in the buffer is adapted to be represented by a Buffer Status Report, BSR.

Embodiment 10. The UE 120 according to any of the embodiments 8-9 wherein the threshold value related to an amount of user data for SDT is adapted to be represented by a threshold value relating to all the pending data that goes into the first uplink grant allocation transmission, the UE 120 is further being configured to when determined that all the pending data goes into in the first uplink grant allocation transmission, transmit e.g. by means of the transmitting unit in the UE 120, to the network node 110, all the pending data in the first uplink grant allocation transmission, and omitting the indication of the user data in the buffer in the first uplink grant allocation transmission, when determined that not all the pending data goes into in the first uplink grant allocation transmission, transmit to the network node 110, a part of all pending data in the buffer that goes into in the first uplink grant allocation transmission and the indication of the user data in the buffer in the first uplink grant allocation transmission, e.g. by means of the transmitting unit in the UE 120, wherein the indication of the user data in the buffer is adapted to indicate to the network node 110 how many further transmissions that are needed for transmitting the rest of the pending data to emptying the buffer.

Embodiment 11. The UE 120 according to any of the embodiments 8-11, wherein:

the indication of the user data in the buffer in the first uplink grant allocation transmission is adapted to further indicate data available on a logical channel or logical channel group not part of the SDT DRB configuration.

Embodiment 12. The UE 120 according to any of the embodiments 8-11, further being configured to:

determine, e.g. by means of the determining unit in the UE 120, an amount of user data configured for SDT, that goes into a first uplink grant allocation based on any one out of:

an uplink grant message, Msg2, in case of 4-step RACH, or

System Information, SI, in case of 2-step RACH.

Further Extensions and Variations

Figure 16:
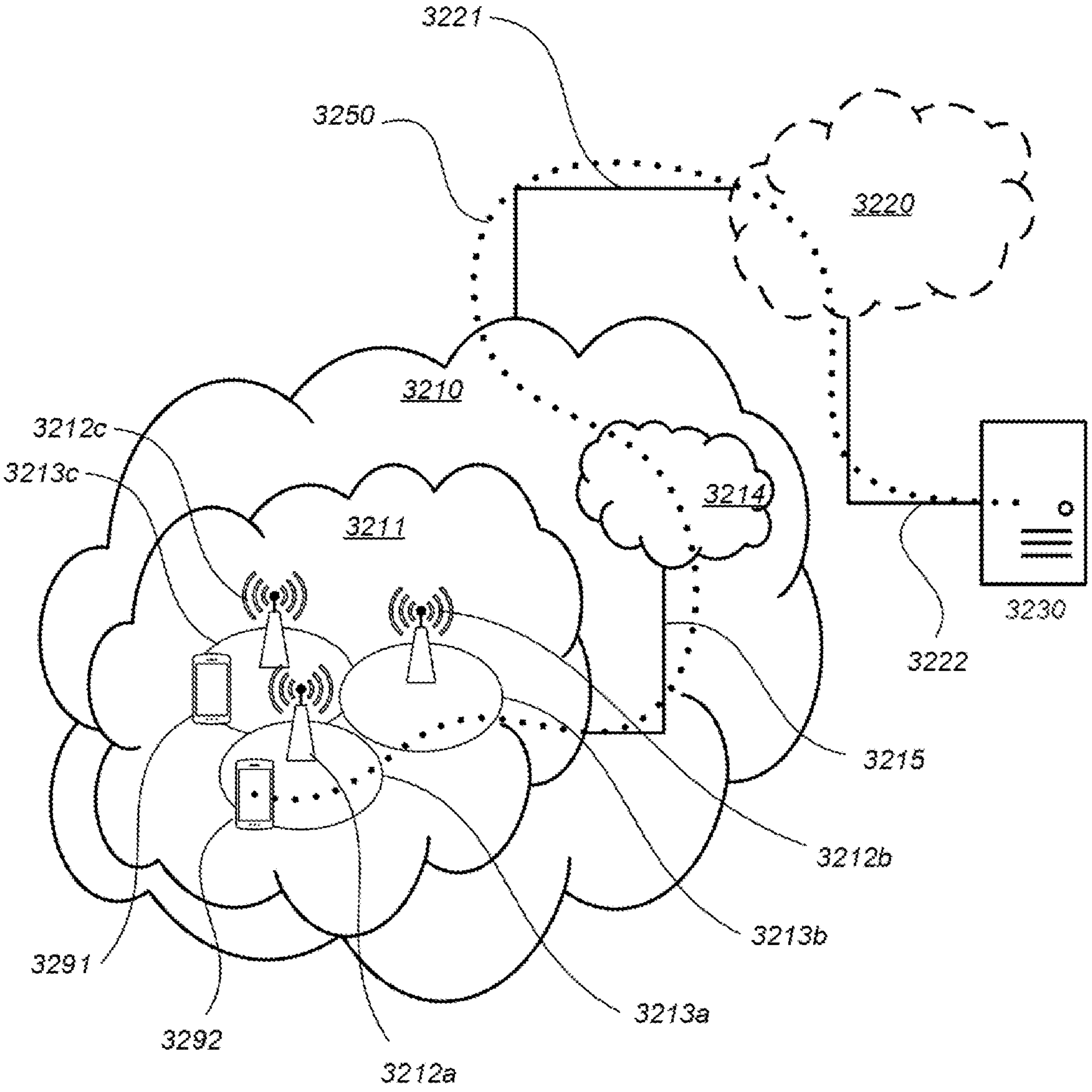
FIG. 16 schematically illustrates a telecommunication network connected via an intermediate network to a host computer.

With reference to FIG. 16, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, access nodes, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) e.g. the UE 120 such as a Non-AP STA 3291 located in coverage area 3213*c* is configured to wirelessly connect to, or be paged by, the corresponding base station 3212*c*. A second UE 3292 e.g. the wireless device 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 16 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 17. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 17:
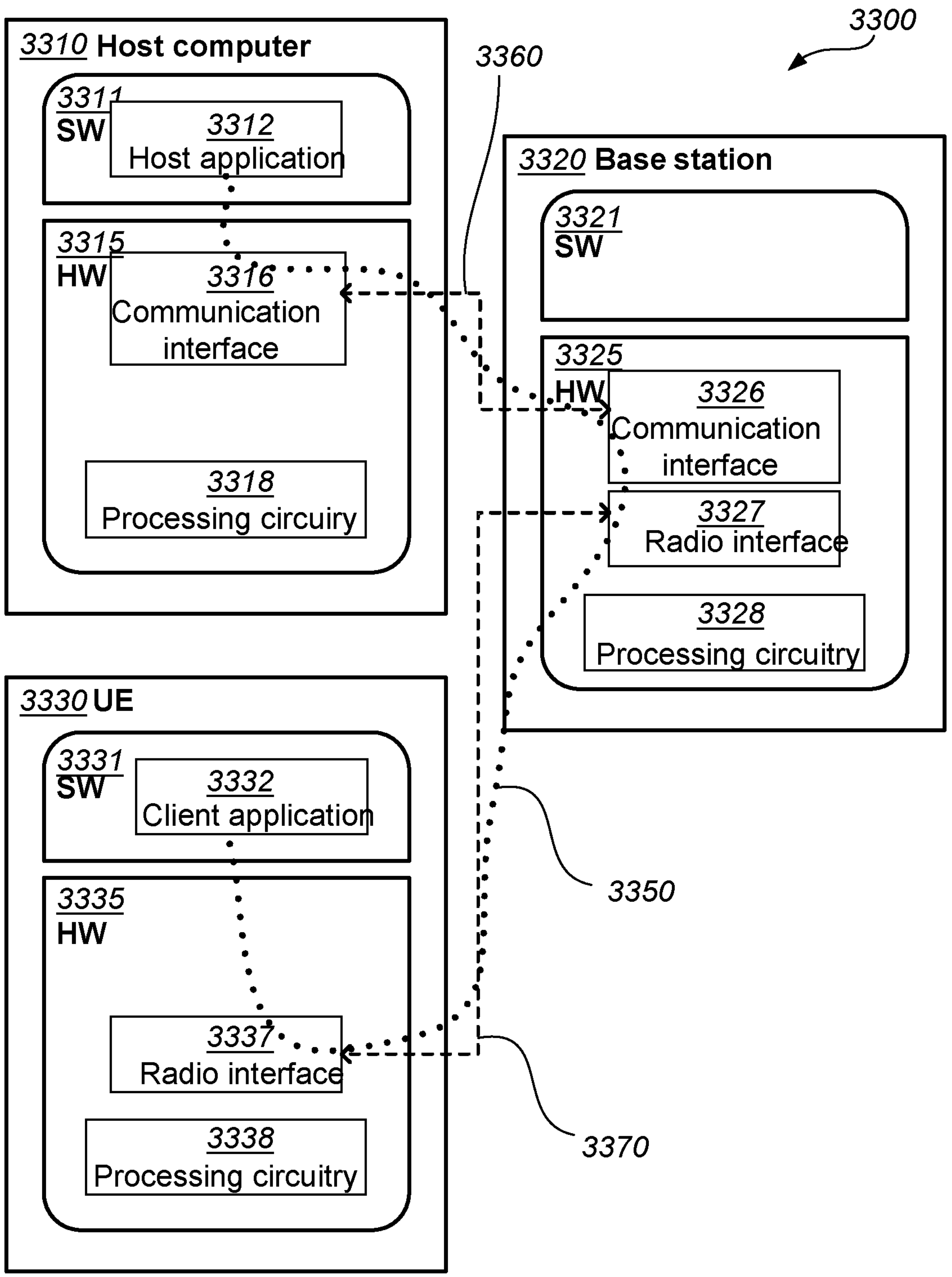
FIG. 17 is a generalized block diagram of a host computer communicating via a base station with a user equipment over a partially wireless connection.

It is noted that the host computer 3310, base station 3320 and UE 3330 illustrated in FIG. 17 may be identical to the host computer 3230, one of the base stations 3212*a*, 3212*b*, 3212*c* and one of the UEs 3291, 3292 of FIG. 16, respectively. This is to say, the inner workings of these entities may be as shown in FIG. 17 and independently, the surrounding network topology may be that of FIG. 16.

In FIG. 17, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 18:
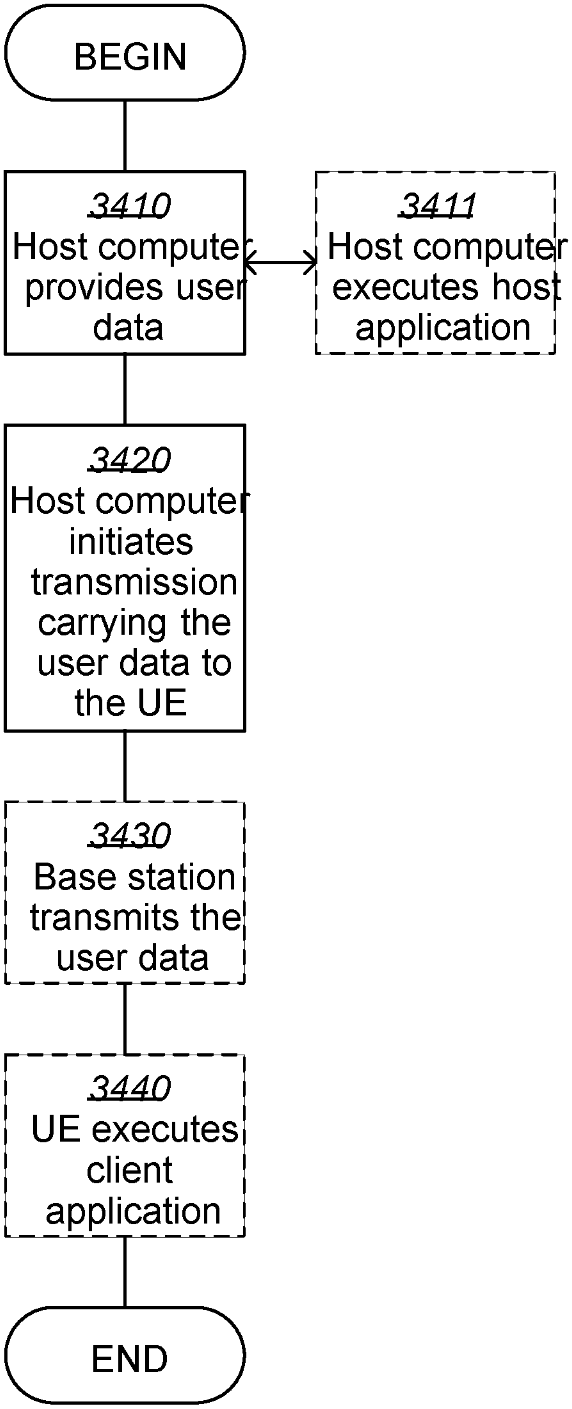
FIGS. 18-21 are flowcharts illustrating methods implemented in a communication system including a host computer, a base station and a user equipment.

FIG. 18 is a flowchart illustrating a method implemented in a communication system, in accordance with one embodiment. The communication system includes a host computer, a base station such as the network node 110, and a UE such as the UE 120, which may be those described with reference to FIG. 16 and FIG. 17. For simplicity of the present disclosure, only drawing references to FIG. 18 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

Figure 19:
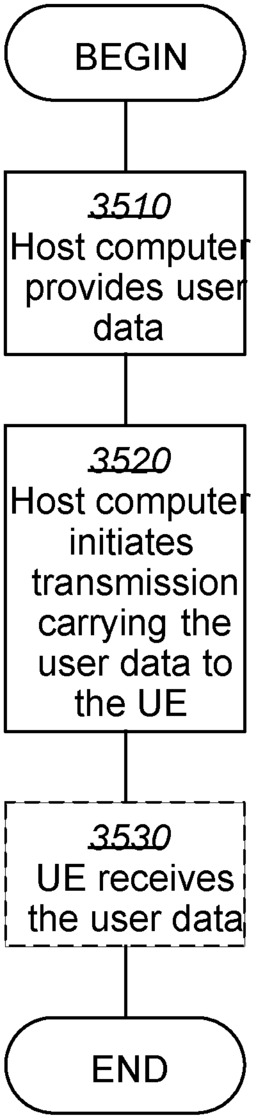

FIG. 19 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 19 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figure 20:
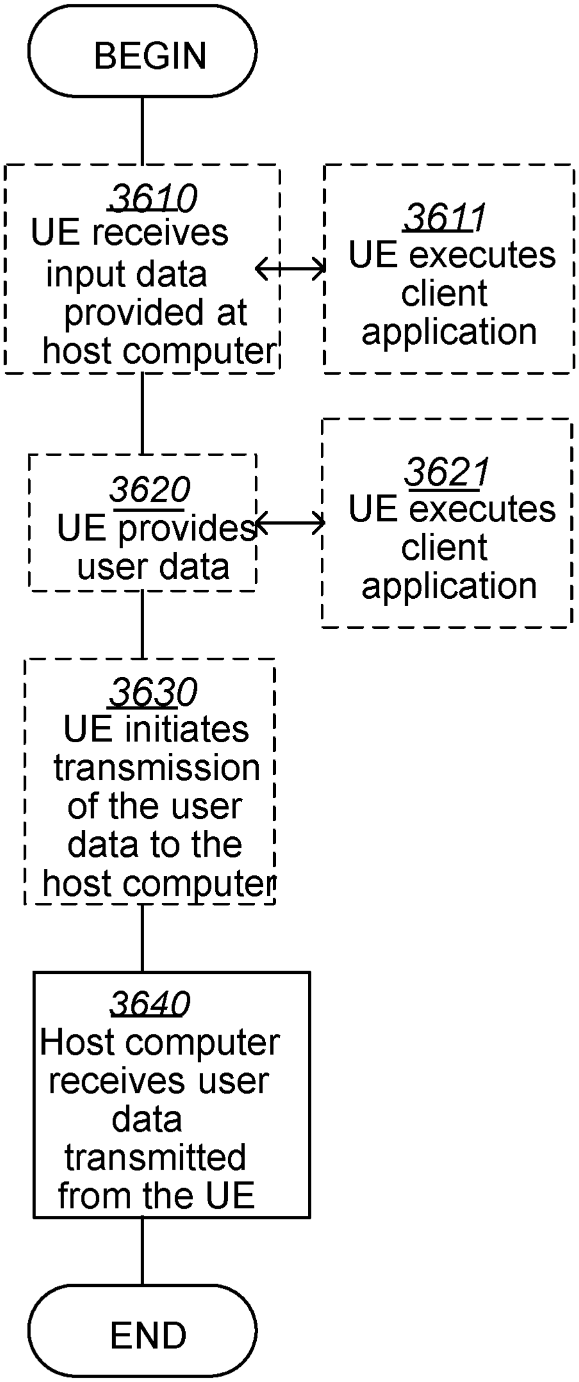

FIG. 20 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 20 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

Figure 21:
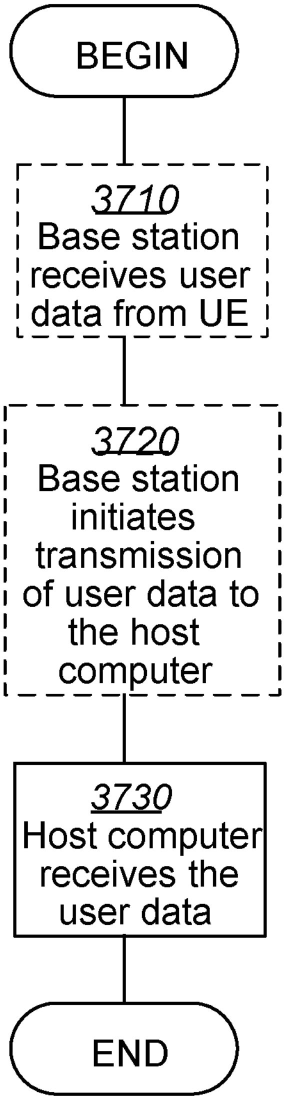

FIG. 21 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 21 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

| Abbreviation | Explanation |
|---|---|
| BSR | Buffer Status Report |
| CORESET | Control Resource Set |
| CN | Core Network |
| CSS | Common Search Space |
| DCI | Downlink Control Indicator |
| DVT | Data Volume Threshold |
| EDT | Early Data Transmission |
| MIB | Master Information Block |
| Msg | Message |
| NR | New Radio |
| PBCH | Physical Broadcast Channel |

-continued

| Abbreviation | Explanation |
|---|---|
| PDCCH | Physical Downlink Control Channel |
| PDSCH | Physical Downlink Shared Channel |
| PRACH | Physical Random Access Channel |
| RACH | Random Access Channel |
| RAR | Random Access Response |
| SDT | Small Data Transmission |
| SSB | Synchronization Signal Block |

The invention claimed is:

1. A method performed by a User Equipment (UE) for controlling an indication of user data in a buffer of the UE for Small Data Transmission (SDT) in a wireless communications network when the UE is in inactive mode, the method comprising:

obtaining pending user data for the SDT into the buffer of the UE;

based on a threshold value related to an amount of the user data for the SDT, determining whether or not to include the indication of user data in the buffer into a first uplink grant allocation transmission for the SDT to be transmitted to a network node;

when the indication of user data in the buffer is not included in the transmitted first uplink grant allocation transmission, this indicates to the network node that the amount of user data left in the buffer is less than the threshold value minus the first allocated grant transmission size; and when the indication of user data in the buffer is included in the transmitted first uplink grant allocation transmission, the indication indicates to the network node how many further transmissions are needed for transmitting rest of the pending user data not included when transmitted in the first uplink grant allocation transmission.

2. The method according to claim 1, wherein the indication of user data in the buffer is represented by a Buffer Status Report (BSR).

3. The method according to claim 1, wherein the threshold value related to an amount of user data for SDT is represented by a threshold value relating to all the pending user data that goes into the first uplink grant allocation transmission, and wherein the method further comprises:

when determined that all the pending user data goes into in the first uplink grant allocation transmission, transmitting to the network node, all the pending user data in the first uplink grant allocation transmission, and omitting the indication of the user data in the buffer in the first uplink grant allocation transmission; and when determined that not all the pending user data goes into in the first uplink grant allocation transmission, transmitting to the network node, a part of all pending user data in the buffer that goes into in the first uplink grant allocation transmission and the indication of the user data in the buffer in the first uplink grant allocation transmission, wherein the indication of the user data in the buffer indicates to the network node how many further transmissions that are needed for transmitting the rest of the pending user data to emptying the buffer.

4. The method according to claim 1, wherein:

the indication of the user data in the buffer in the first uplink grant allocation transmission further indicates user data available on a logical channel or logical channel group not part of the SDT Data Radio Bearer (DRB) configuration.

5. The method according to claim 1, further comprising:

determining an amount of user data configured for Small data Transmission (SDT) that goes into a first uplink grant allocation based on any one out of:

an uplink grant message (Msg2) in case of 4-step Random Access Channel (RACH), or System Information (SI) in case of 2-step RACH.

6. A computer program stored in a non-transitory storage medium for controlling an indication of user data in a buffer of a user equipment (UE) for Small Data Transmission (SDT) in a wireless communications network when the UE is in inactive mode, the computer program comprising instructions, which when executed by a processor, causes the processor to perform actions, the actions comprising:

obtaining pending user data for the SDT into the buffer of the UE;

based on a threshold value related to an amount of the user data for the SDT, determining whether or not to include the indication of user data in the buffer into a first uplink grant allocation transmission for the SDT to be transmitted to a network node;

when the indication of user data in the buffer is not included in the transmitted first uplink grant allocation transmission, this indicates to the network node that the amount of user data left in the buffer is less than the threshold value minus the first allocated grant transmission size; and when the indication of user data in the buffer is included in the transmitted first uplink grant allocation transmission, the indication indicates to the network node how many further transmissions are needed for transmitting rest of the pending user data not included when transmitted in the first uplink grant allocation transmission.

7. A User Equipment (UE) configured to control an indication of user data in a buffer of the UE for Small Data Transmission (SDT) in a wireless communications network when the UE is in inactive mode, wherein the UE is configured to:

obtain pending user data for the SDT into the buffer of the UE;

based on a threshold value related to an amount of the user data for the SDT, determine whether or not to include the indication of user data in the buffer into a first uplink grant allocation transmission for the SDT to be transmitted to a network node;

when the indication of user data in the buffer is not included in the transmitted first uplink grant allocation transmission, this is adapted to indicate to the network node that the amount of user data left in the buffer is less than the threshold value minus the first allocated grant transmission size; and when the indication of user data in the buffer is included in the transmitted first uplink grant allocation transmission, the indication is adapted to indicate to the network node how many further transmissions are needed for transmitting rest of the pending user data not included when transmitted in the first uplink grant allocation transmission.

8. The UE according to claim 7, wherein the indication of user data in the buffer is adapted to be represented by a Buffer Status Report (BSR).

9. The UE according to claim 7, wherein the threshold value related to an amount of user data for SDT is adapted to be represented by a threshold value relating to all the pending user data that goes into the first uplink grant allocation transmission, the UE is further being configured to:

when determined that all the pending user data goes into in the first uplink grant allocation transmission, transmit to the network node, all the pending user data in the first uplink grant allocation transmission, and omitting the indication of the user data in the buffer in the first uplink grant allocation transmission; and when determined that not all the pending user data goes into in the first uplink grant allocation transmission, transmit to the network node, a part of all pending user data in the buffer that goes into in the first uplink grant allocation transmission and the indication of the user data in the buffer in the first uplink grant allocation transmission, wherein the indication of the user data in the buffer is adapted to indicate to the network node how many further transmissions that are needed for transmitting the rest of the pending user data to emptying the buffer.

10. The UE according to claim 7, wherein:

the indication of the user data in the buffer in the first uplink grant allocation transmission is adapted to further indicate data available on a logical channel or logical channel group not part of the SDT Data Radio Bearer (DRB) configuration.

11. The UE according to claim 7, further being configured to:

determine an amount of user data configured for Small Data Transmission (SDT) that goes into a first uplink grant allocation based on any one out of:

an uplink grant message (Msg2) in case of 4-step Random Access Channel (RACH), or System Information (SI) in case of 2-step RACH.

* * * * *